United States Patent
Yamazaki et al.

(10) Patent No.: US 9,230,313 B2
(45) Date of Patent: Jan. 5, 2016

(54) FEATURE EXTRACTION METHOD, OBJECT CLASSIFICATION METHOD, OBJECT IDENTIFICATION METHOD, FEATURE EXTRACTION DEVICE, OBJECT CLASSIFICATION DEVICE, OBJECT IDENTIFICATION DEVICE, FEATURE EXTRACTION/OBJECT CLASSIFICATION/OBJECT IDENTIFICATION PROGRAM, AND RECORDING MEDIUM ON WHICH THE PROGRAM IS RECORDED

(75) Inventors: Kimitoshi Yamazaki, Tokyo (JP); Masayuki Inaba, Tokyo (JP)

(73) Assignee: Japan Science and Technology Agency, Saitama (JP)

( * ) Notice: Subject to any disclaimer, the term of this patent is extended or adjusted under 35 U.S.C. 154(b) by 0 days.

(21) Appl. No.: 14/365,811

(22) PCT Filed: Jul. 18, 2012

(86) PCT No.: PCT/JP2012/068229
§ 371 (c)(1),
(2), (4) Date: Oct. 21, 2014

(87) PCT Pub. No.: WO2013/088772
PCT Pub. Date: Jun. 20, 2013

(65) Prior Publication Data
US 2015/0043819 A1      Feb. 12, 2015

(30) Foreign Application Priority Data

Dec. 16, 2011   (JP) ................. 2011-275582

(51) Int. Cl.
G06K 9/00  (2006.01)
G06T 5/40  (2006.01)
G06K 9/62  (2006.01)
G06K 9/46  (2006.01)
G06T 5/00  (2006.01)
(Continued)

(52) U.S. Cl.
CPC .............. *G06T 5/40* (2013.01); *G06K 9/00201* (2013.01); *G06K 9/4642* (2013.01); *G06K 9/4661* (2013.01); *G06K 9/62* (2013.01); *G06T 5/003* (2013.01); *G06T 5/10* (2013.01); *G06T 5/50* (2013.01); *G06T 2207/10016* (2013.01); *G06T 2207/30128* (2013.01); *G06T 2207/30181* (2013.01); *G06T 2207/30184* (2013.01)

(58) Field of Classification Search
None
See application file for complete search history.

(56) References Cited

FOREIGN PATENT DOCUMENTS

| JP | 2008-217494 A | 9/2008 |
|----|---------------|--------|
| JP | 2009-535680 A | 10/2009 |
| WO | WO-2007/128452 A2 | 11/2007 |

OTHER PUBLICATIONS

D.G. Lowe, "Distinctive Image Features from Scale-Invariant Keypoints," The International Journal of Computer Vision, vol. 60, No. 2, Jan. 5, 2004, pp. 91-110.
(Continued)

*Primary Examiner* — Nirav G Patel
*Assistant Examiner* — Amandeep Saini
(74) *Attorney, Agent, or Firm* — Michael Best & Friedrich LLP

(57) ABSTRACT

Provided is a feature extraction that extracts a feature that represents a characteristic of a subject, the feature being extracted from an image that has imaged the subject, the feature being extracted without relation to the shape of the subject. The feature extraction extracts the feature from the image of the subject, the subject having been imaged by an imaging means.

15 Claims, 15 Drawing Sheets

(51) Int. Cl.
*G06T 5/10* (2006.01)
*G06T 5/50* (2006.01)

(56) References Cited

OTHER PUBLICATIONS

K. Hamajima and M. Kakikura, "Planning Strategy for Unfolding Task of Clothes—Isolation of clothes from washed mass—," Pro. of International Conf. on Robots and Systems, Jul. 2000, pp. 1237-1242.

Y. Kita, F. Saito and N. Kita, "A deformable model driven method for handling clothes," Proc. of International Conf. on Pattern Recognition, 2004, 5 sheets, IEEE.

F. Osawa, H. Seki and Y. Komiya, "Unfolding of Massive Laundry and Classification Types by Dual Manipulator," Journal of Advanced Computational Interlligence and Intelligent Informatics, vol. 11, No. 5, 2007, pp. 457-458.

Maitin-Shepard, M. Cusumano-Towner, J. Lei and P. Abbeell, "Cloth Grasp Point Detection based on Multiple-View Geometric Cues with Application to Robotic Towel Folding," International Conf. on Robotics and Automation, 2010, pp. 2308-2315.

Y. Zhao and G. Karypis, "Comparison of Agglomerative and Partitional Document Clustering Algorithms," University of Minnesota-Computer Science and Engineering Technical Report, No. 02-014, 2002.

C.Chang and C. Lin, "LIBSVM—A Library for Support Vector Machines," http://www.csie.ntu.edu.tw/~cjlin/libsvm/.

K. Yamazaki and M. Inaba, "Shiwa ya Ore Kasanari ni Chakumoku shite Gazo Tokuchoryo ni yoru Nuno no Jotai Hyogen," Meeting on Image Recognition and Understanding (MIRU2011), IS4-45, Jul. 2011, pp. 1583-1588.

K. Tanaka, K. Machida, S. Matsuura and S. Akamatsu, "Racial effect in face identification system," Technical Report of IEICE, PRMU2003-277, Mar. 2004, pp. 127-132, The Institute of Electronics, Information and Communication Engineers.

International Search Report issued in Application No. PCT/JP2012/068229, mailed Aug. 21, 2012.

FIG.1
(1)
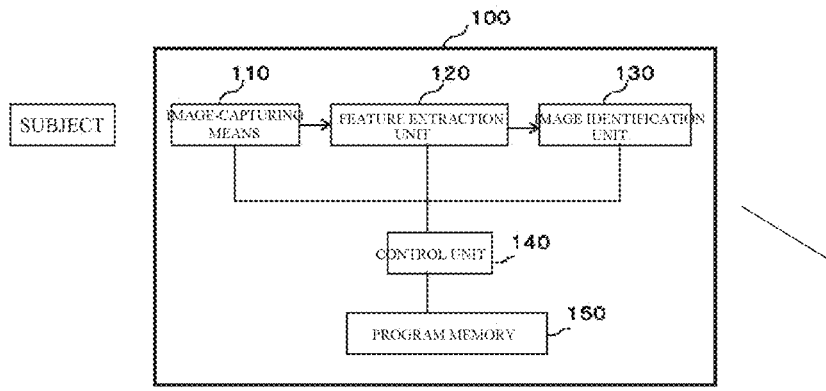
(2)
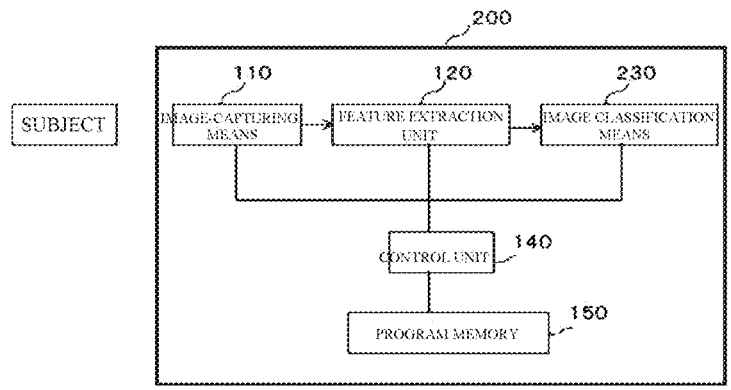
(3)
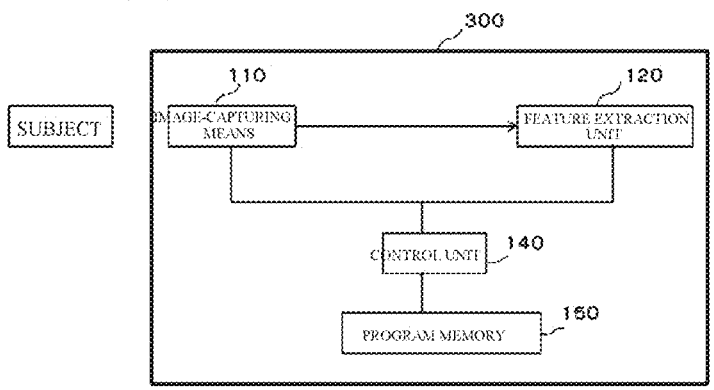

FIG.2
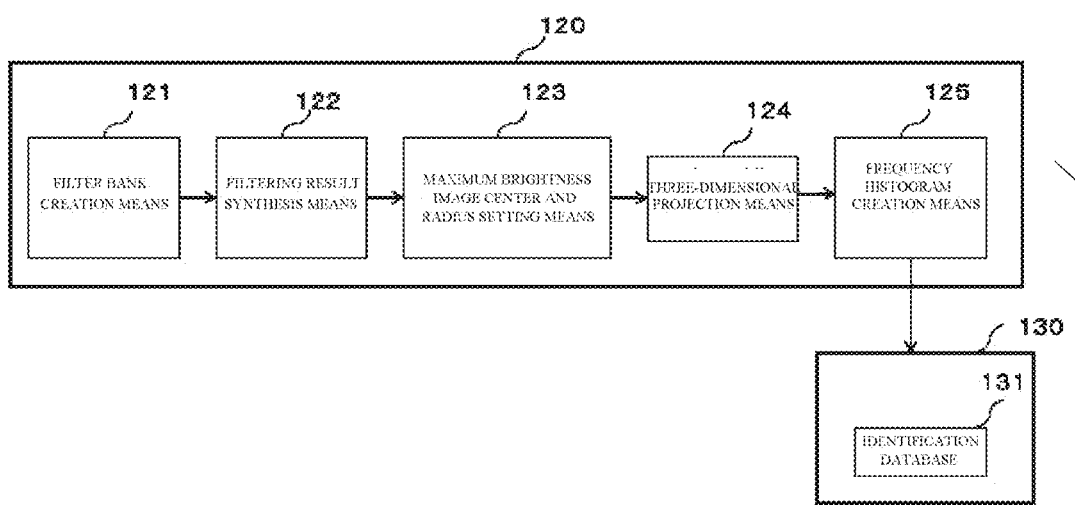
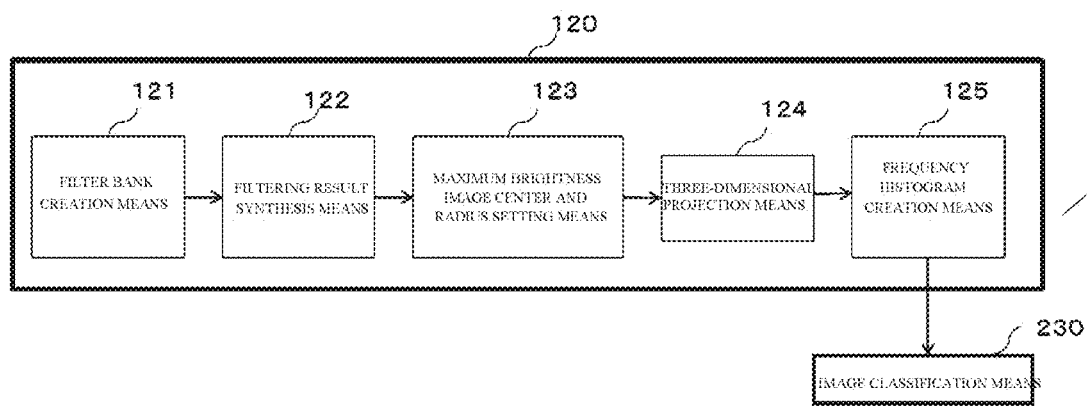

(A) CM-WD (B) OVLP

FEATURE EXTRACTION METHOD, OBJECT CLASSIFICATION METHOD, OBJECT IDENTIFICATION METHOD, FEATURE EXTRACTION DEVICE, OBJECT CLASSIFICATION DEVICE, OBJECT IDENTIFICATION DEVICE, FEATURE EXTRACTION/OBJECT CLASSIFICATION/OBJECT IDENTIFICATION PROGRAM, AND RECORDING MEDIUM ON WHICH THE PROGRAM IS RECORDED

TECHNICAL FIELD

The present invention relates to a feature extraction method, object classification method, object identification method, feature extraction device, object classification device, object identification device, feature extraction/object classification/object identification program, and recording medium on which the program is recorded, and in particular, relates to a method for extracting the feature description of a soft item, irrespective of the shape of the soft item, from an image obtained by imaging the soft item as a subject, an object classification method and an object identification method in which the extracted feature description is used, an object classification device and an object identification device, and a program for causing a computer to function as a feature extraction device, object classification device, and object identification device.

BACKGROUND ART

Today, mechanization has progressed in a variety of fields due to technological advancements. When an object is operated using a robot, there is a need to identify the position, type, and other attributes of the object; therefore, an image obtained by a CCD camera or other means is processed and analyzed, thereby fulfilling a function corresponding to the human eye.

A variety of types of objects exist in the everyday environment of human lifestyle, from rigid bodies that have shapes that do not change at all to objects such as cloth or paper that change to a variety of shapes. When performing automation using a robot, there is a need to identify what the object is from an image irrespective of the shape of the object.

In recent years, SIFT (non-patent document 1) is commonly used for identification of objects by image processing. This method enables image processing even when the manner in which the object is visible changes to a certain degree, but is image processing that basically assumes that the object is a rigid body, and is therefore difficult to apply for identification of, e.g., (1) soft items such as clothing that may assume a variety of shapes through folded overlapping, bending, creasing, or the like, (2) asphalt portions of roads and bare earth or grass portions on the shoulder, (3) foreign objects that are mixed in or layered onto the subject, such as dust on a floor, or (4) vegetables and fruits, which assume different outer shapes even between the same type due to, e.g., bending or the shape of leaves. Therefore, in order to provide lifestyle assistance in the everyday environment of humans, there is a need for, e.g., (1) an image processing method for appropriately identifying soft items, in light of cases in which automated machines such as robots handle laundry, which is a soft item; (2) an image processing method for an automated travel system in which electric wheelchairs or automobiles used by the visually impaired travel along designated positions; and (3) an image processing method for identifying soiled portions on the floor when an automatic vacuum cleaner cleans the floor. In addition, there is also a need for (4) an image processing method for accurately classifying and/or identifying objects that may assume a variety of outer shapes in industry settings such as classification of vegetables and fruits in a food factory.

With regards to image processing methods in relation to soft items, a variety of image features have been conventionally used. For example, Kakikura et al. realized an isolation task using color information (see non-patent document 2). Ono et al. proposed a method for expressing, with regards to a square cloth product such as a handkerchief, a state in which a part of the product is folded (see non-patent document 3). Kita et al. proposed a method for using a three-dimensional variable shape model, and applying the model to a group of three-dimensional points obtained by measurement (see non-patent document 4). However, in these existing studies, the type of cloth product is provided in advance, or identification information for specifying the cloth product is defined as, e.g., the color of the material, and information for specifying the cloth product or the like is necessary in advance.

If there is a method making it possible to extract feature descriptions of a cloth product or the like from an image that can be generically used without requiring information for specifying the product as described above, it is possible to classify a plurality of types of products into identical products for lifestyle support or in a cleaning plant. In addition, if there is a method making it possible to identify the classified product, the method might be useful for automation using a robot or the like. Accordingly, Osawa et al. (see non-patent document 5), and Abbeel et al. (see non-patent document 6) propose methods for identifying the outline or the position of the bottom end point of a cloth product while a robot is operating the cloth product, and identifying the type of the cloth product.

PRIOR ART DOCUMENTS

Non-Patent Documents

Non-patent document 1: D. G. Lowe "Distinctive image features from scale-invariant keypoints," Int'l Journal of Computer Vision, vol. 60, No. 2, pp. 91-110, 2004.

Non-patent document 2: K. Hamajima and M. Kakikura: "Planning Strategy for Unfolding Task of Clothes—Isolation of clothes from washed mass—," in Proc. of Int'l Conf. on Robots and Systems, pp. 1237-1242, 2000

Non-patent document 3: E. Ono, H. Okabe, H. Ichijo and N. Aisaka "Robot Hand with Sensor for Cloth Handling," In Proc. 1990, Japan, USA Symp. on Flexible Automation, pp. 1363-1366, 1990

Non-patent document 4: Y. Kita, F. Saito and N. Kita: "A deformable model driven method for handling clothes," Proc. of Int. Conf. on Pattern Recognition, 2004.

Non-patent document 5: F. Osawa, H. Seki, and Y. Kamiya, "Unfolding of Massive Laundry and Classification Types by Dual Manipulator," Journal of Advanced Computational Intelligence and Intelligent Informatics, Vol. 11 No. 5, pp. 457-, 2007.

Non-patent document 6: J. Maitin-Shepard, M. Cusumano-Towner, J. Lei and P. Abbeel: "Cloth Grasp Point Detection based on Multiple-View Geometric Cues with Application to Robotic Towel Folding," Int'l. Conf. on Robotics and Automation, pp. 2308-2315, 2010.

Non-patent document 7: Y. Zhao and G. Karypis: "Comparison of agglomerative and partitional document clustering algorithms," University of Minnesota-Computer Science and Engineering Technical Report, No. 02-014, 2002 Non-patent document 8: C. Chang and C. Lin: "LIVSVM".

DISCLOSURE OF INVENTION

Problems to be Solved by Invention

However, in each of the aforementioned image processing methods, a soft item is subjected to a physical operation, and it is difficult to identify the type and the like of soft items in a state of being foldedly overlapped or a state of being crumpled into an irregular shape, such as a handkerchief that has been taken out of a pocket or clothing that has been taken out from a clothes basket. In addition, it is also difficult to identify objects that are mixed in or layered on a subject, or to classify or identify objects that have different appearances even between the same types.

As a result of intense research, the inventors of the present invention have newly discovered a method for extracting a feature description representing a consistent feature irrespective of the outer shape such as creasing or folded overlapping as long as the material is identical or irrespective of any difference in outer shape due to individual differences as long as the type of object is identical, and a method for extracting a feature description representing a consistent feature for each object irrespective of the shape of different objects mixed in or layered on a subject. The inventors also discovered that classifying subjects on the basis of the feature description extracted by the feature extraction method makes it possible to classify the subjects into the same classification, and that making a comparison with the feature description of a subject that is already known makes it possible to identify what the subject is, and arrived at the present invention.

Specifically, an object of the present invention is to provide a method for extracting, from an image obtained by imaging a subject, a feature description representing a feature of the subject irrespective of the shape of the subject, and a method for classifying and a method for identifying a subject using the extracted feature description. Another object of the present invention is to provide an object classification device and an object identification device in which the feature extraction method is used. Another object of the present invention is to provide a program for causing a computer to function as a feature extraction device, an object classification device, or an object identification device, and a recording medium on which the program is recorded.

Means for Solving the Problem

The present invention is the following feature extraction method, object classification method, object identification method, feature extraction device, object classification device, object identification device, feature extraction/object classification/object identification program, and recording medium on which the program is recorded.

(1) A feature extraction method for extracting a feature description from an image of a subject captured by image-capturing means, the feature extraction method characterized in having:

a step for creating a filter bank from the image;

a step for creating a maximum brightness image from the filter bank;

a step for setting a circular image region of the maximum brightness image, and setting a center Cc and a radius Rc of the circular image region;

a step for projecting pixels in the maximum brightness image in a three-dimensional space having axes representing (a) the ratio between the distance $L_D$ between the pixel position (x, y) and the center Cc, and the radius Rc, (b) the brightness value $F_D(x, y)$ of the pixel, and (c) the total of the difference between the brightness value $F_D$ of the pixel and the brightness value of a nearby pixel; and a step for creating a frequency histogram from the pixels projected in the three-dimensional space.

(2) A feature extraction method for extracting a feature description from an image of a subject captured by image-capturing means, the feature extraction method characterized in having:

a step for creating a filter bank from the image;

a step for creating a maximum brightness image from the filter bank;

a step for setting a circular image region of the maximum brightness image, and setting a center Cc and a radius Rc of the circular image region;

a step for projecting pixels in the maximum brightness image in a three-dimensional space having axes representing (d) the ratio between the distance $L_O$ between the position (x, y) of a pixel of interest and the center Cc, and the radius Rc, (e) a value $E_O$ in which whether the pixel of interest is positioned on the upper side or the lower side of a folded overlap is evaluated by a continuous value, and (f) a direction component of the folded overlap portion in which the pixel of interest is present; and a step for creating a frequency histogram from the pixels projected in the three-dimensional space.

(3) The feature extraction method according to (1) or (2), characterized in the subject being a soft item.

(4) The feature extraction method according to any of (1) through (3), characterized in the filter bank being created using a Gabor filter.

(5) An object classification method, characterized in a subject being classified using a frequency histogram extracted using the feature extraction method according to any of (1) through (4).

(6) An object identification method, characterized in a frequency histogram extracted using the feature extraction method according to any of (1) through (4) being compared to a frequency histogram of a known subject.

(7) The object identification method according to (6), characterized in a plurality of types of the known subject existing, and the extracted frequency histogram being compared with a frequency histogram of the plurality of known-subject types, whereby the type of the subject is identified.

(8) A feature extraction device for extracting a feature description from an image of a subject captured by image-capturing means, the feature extraction device characterized in having:

filter bank creation means for creating a filter bank from the image;

filtering result synthesizing means for creating a maximum brightness image from the filter bank;

maximum brightness image center and radius setting means for setting a circular image region of the maximum brightness image, and setting a center Cc and a radius Rc of the circular image region;

three-dimensional projection means for projecting pixels in the maximum brightness image in a three-dimensional space having axes representing (a) the ratio between the distance $L_D$ between the pixel position (x, y) and the center Cc, and the radius Rc, (b) the brightness value $F_D(x, y)$ of the pixel, and (c) the total of the difference between the brightness value $F_D$ of the pixel and the brightness value of a nearby pixel; and frequency histogram creation means for creating a frequency histogram from the pixels projected in the three-dimensional space.

(9) A feature extraction device for extracting a feature description from an image of a subject captured by image-capturing means, the feature extraction device characterized in having:

filter bank creation means for creating a filter bank from the image;

filtering result synthesizing means for creating a maximum brightness image from the filter bank;

maximum brightness image center and radius setting means for setting a circular image region of the maximum brightness image, and setting a center Cc and a radius Rc of the circular image region;

three-dimensional projection means for projecting pixels in the maximum brightness image in a three-dimensional space having axes representing (d) the ratio between the distance $L_O$ between the position (x, y) of a pixel of interest and the center Cc, and the radius Rc, (e) a value $E_O$ in which whether the pixel of interest is positioned on the upper side or the lower side of a folded overlap is evaluated by a continuous value, and (f) a direction component of the folded overlap portion in which the pixel of interest is present; and frequency histogram creation means for creating a frequency histogram from the pixels projected in the three-dimensional space.

(10) The feature extraction device according to (8) or (9), characterized in the subject being a soft item.

(11) The feature extraction device according to any of (8) through (10), characterized in the filter bank being created using a Gabor filter.

(12) An object classification device, characterized in the object classification device having image classification means for classifying a subject using a frequency histogram extracted using the feature extraction device according to any of (8) through (11).

(13) An object identification device, characterized in the object identification device having: an identification database storing a frequency histogram of a known subject, and identification means for comparing, with a frequency histogram of a known subject stored in the identification database, and identifying a frequency histogram extracted by the feature extraction device according to any of (8) through (12).

(14) The object identification device according to claim 13, characterized in that:

the frequency histograms of the known subject stored in the identification database are frequency histograms of a plurality of types of subjects, and the identification means compares the extracted frequency histogram with the plurality of types of frequency histograms stored in the identification database, and thereby identifies the type of the subject.

(15) A program, characterized in causing a computer to function as the feature extraction device according to one of (8) through (11), the object classification device according to (12), or the object identification device according to (13) or (14).

(16) A computer-readable recording medium in which the program disclosed in (15) is recorded.

Effect of the Invention

In the present invention, it is possible to extract a feature description that does not depend on the outer shape of a subject, even if there is a difference in the outer shape of the subject due to creasing, folded overlapping, or the like, a difference in the outer shape due to individual differences between objects, or a difference in the outer shape of an object mixed in or layered on a subject, therefore making it possible to classify and identify the subject keeping an intact shape without using physical means. In addition, the image-capturing means does not have to image the subject to a high definition; an image having a relatively low resolution will suffice. Performing a comparison with the feature description of a known subject makes it possible to identify the type of the subject, irrespective of the shape of the subject. In addition, in the feature extraction method, the object classification method, and the object identification method of the present invention, there is no comparison made between the outer shape or the size of the subject. Instead, the appearance of an existing surface due to {features such as} creases and folded overlaps caused by the material or type of the subject, patterns of or on the leaf blades or leaf veins, the presence and density of stalks, stems, or fruits, the earth/sand type, or the type or amount of deposited or adhered matter, or the roughness or the like of the material or the surface finishing of a hard substance, is extracted as a feature description for performing classification and identification. Therefore, the subject can be classified and identified by processing at least one image imaged from an arbitrary angle. As a result, the amount of data required for the classification and identification is minimized, and the processing speed of the required device can thereby be improved.

BRIEF DESCRIPTIONS OF THE DRAWINGS

FIG. 1 shows an overview of a (1) object identification device, (2) object classification device, and (3) feature extraction device of the present invention;

FIG. 2 is a block diagram showing the detailed configuration of (1) a feature extraction unit and image identification unit of the object identification device and (2) a feature extraction unit and image classification means of the object classification device of the present invention;

Figure 10:
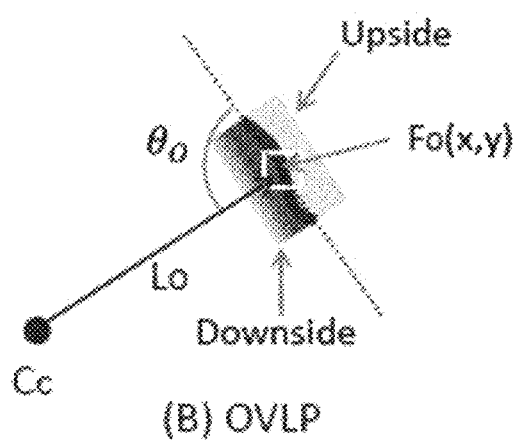
Figure 11:
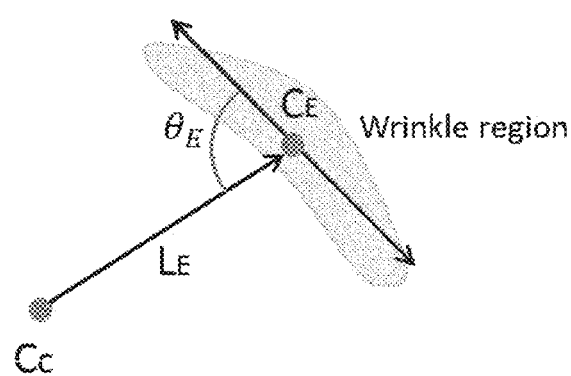
Figure 12:
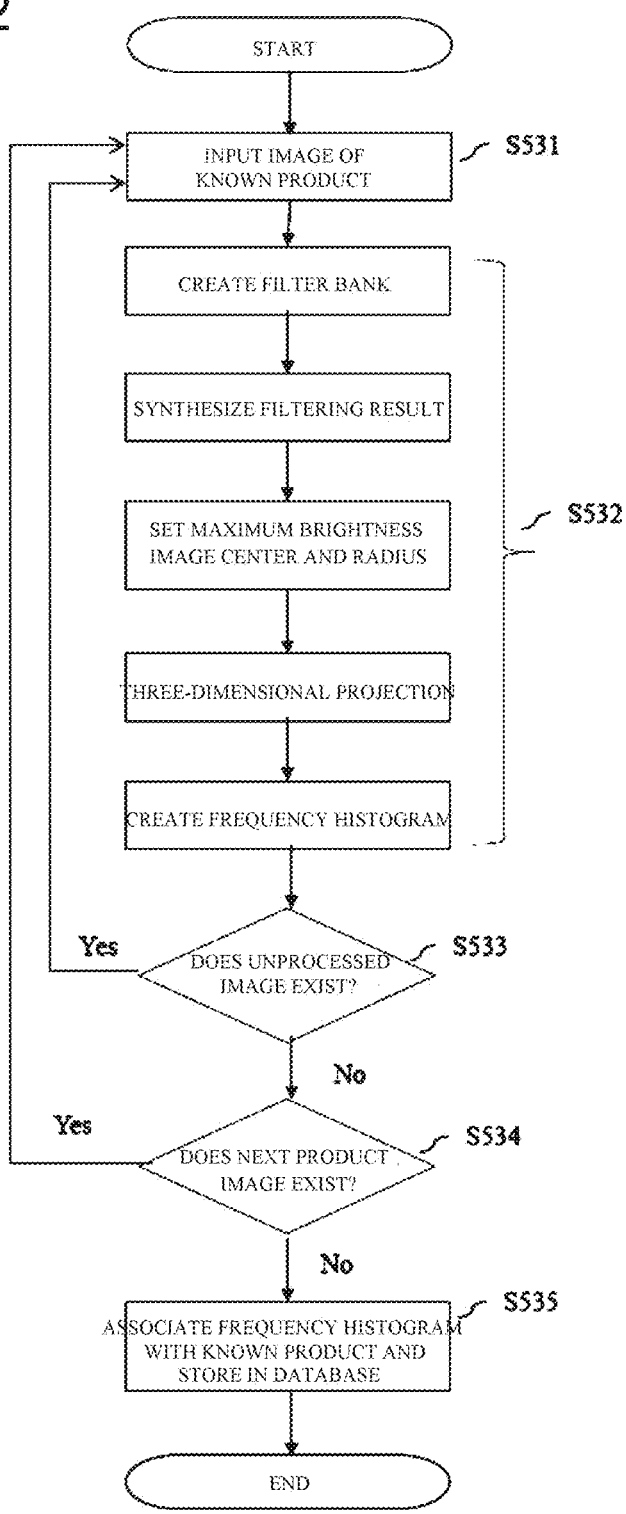
Figure 13:
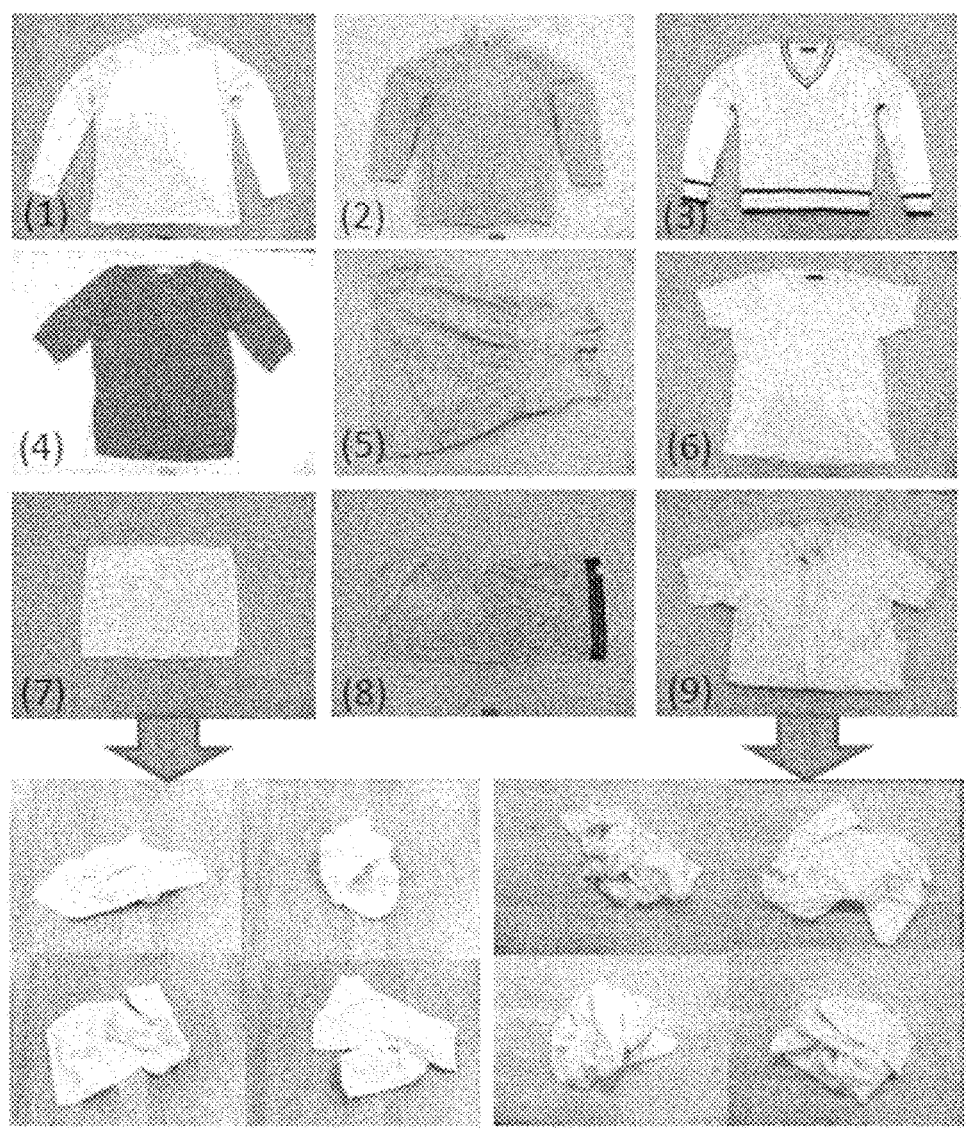
Figure 14:
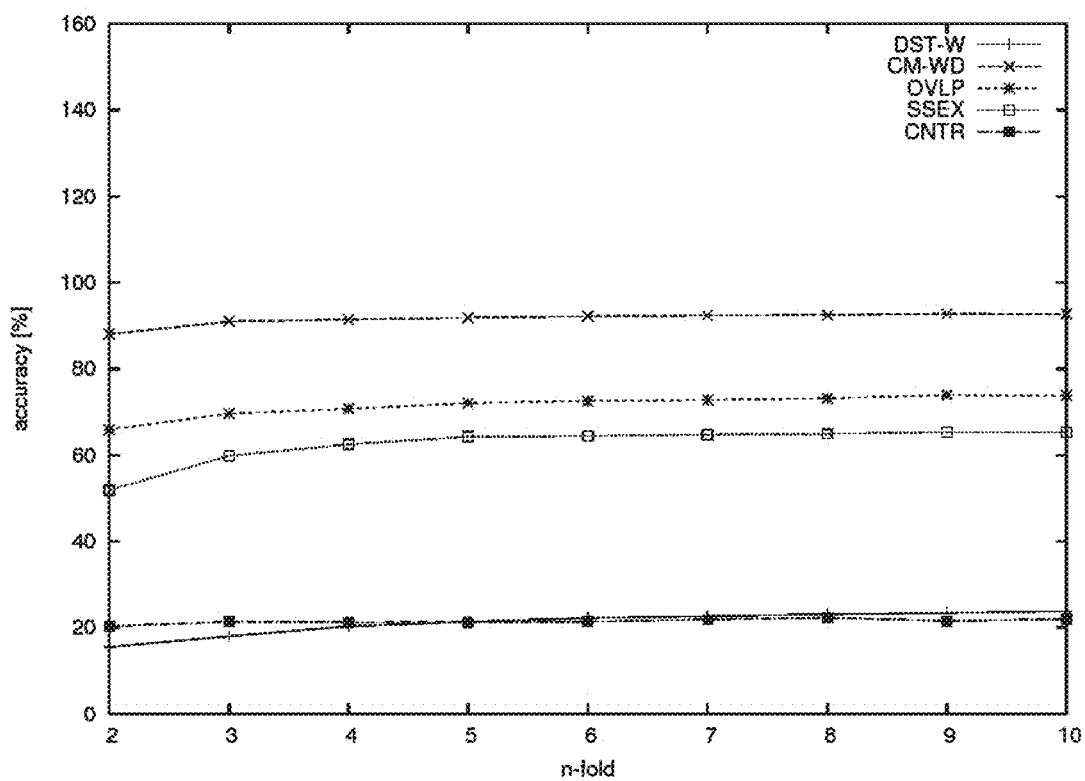
Figure 15:
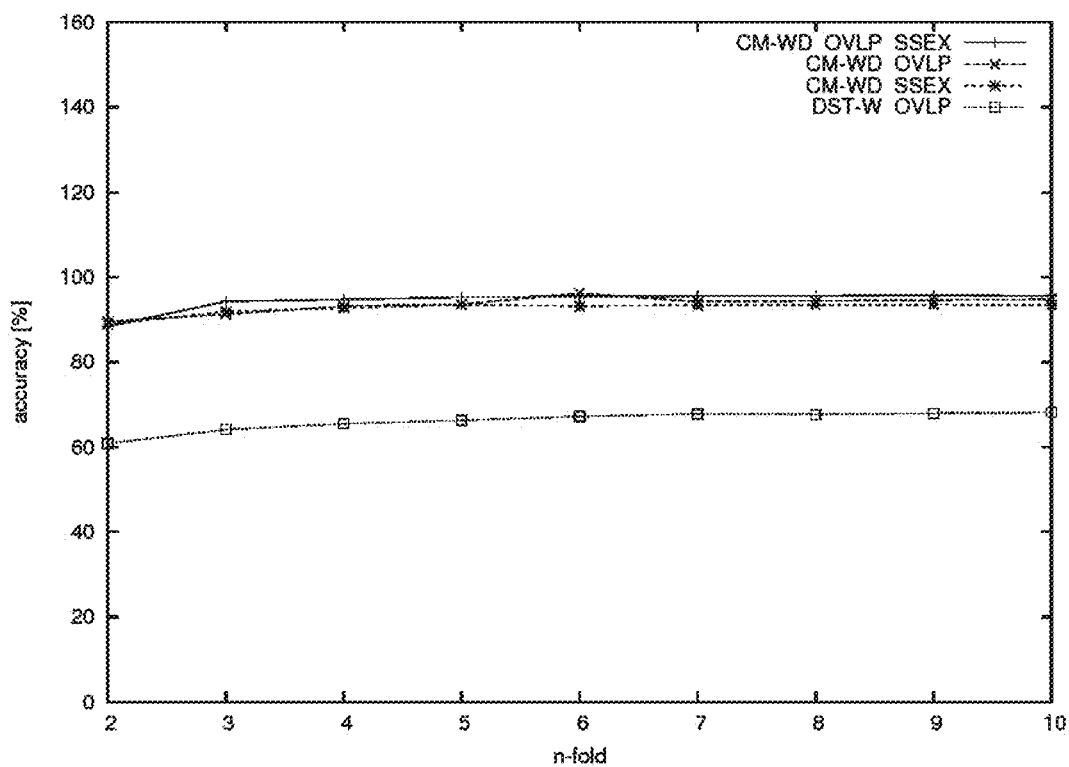

FIG. 10 shows an overview of the OVLP method (feature extraction method focusing on the position and direction of folded overlaps on the cloth) according to the present invention, and shows dividing pixels surrounding the pixel of interest being divided into the upper side and the lower side of the folded overlap, with the center Cc of the target region being the origin, with respect to each pixel on the edge extracted as the folded overlap portion;

FIG. 11 shows an overview of the DST-W method (feature description regarding the distribution and direction of creases) according to a comparative example, and shows the relative angle between a line linking Cc to the center coordinates of the long axis of an elliptical region and the long axis of the elliptical region;

FIG. 12 shows an example of the steps for creating an identification database;

FIG. 13 is a photograph-substituted drawing, in which photographs show cloth products used in the embodiment;

FIG. 14 is a graph showing the identification rates obtained when identification databases were created using feature descriptions extracted according to the feature extraction methods of the present invention and the feature descriptions extracted using the methods according to the comparative examples and cloth products were identified; and FIG. 15 is a graph showing the identification rates when identification databases were created through combing feature descriptions.

DESCRIPTION OF EMBODIMENTS

A best mode for carrying out the present invention will now be described using a drawing.

A feature extraction method, object classification method, and object identification method according to the present invention are carried out, e.g., using a device such as that shown in FIG. 1.

Specifically, FIG. 1(1) shows an example of an object identification device 100, comprising: image-capturing means 110 for imaging a subject; a feature extraction unit 120 for extracting a feature description from the imaged image; an image identification unit 130 having the output from the feature extraction unit 120 supplied thereto and performing identification of the subject; a control unit 140 for controlling the image-capturing means 110, the feature extraction unit 120, and the image identification unit 130; and a program memory 150, which is accessed from the control unit 140. The subject may be imaged by the image-capturing means 110 by a command from the control unit 140 when the subject is placed in the object identification device and the presence of the subject is confirmed by a sensor (not shown), or placed in front of the image-capturing means 110 without using a sensor or the like and imaged by manual operation. In an instance in which the feature description is extracted from an image of the subject imaged using an external image-capturing means and identification of the subject is performed, an arrangement obtained by omitting the image-capturing means 110 in FIG. 1(1) may be used as the object identification device 100.

In an instance in which the subject is classified without the identification of the subject being performed, providing image classification means 230 instead of the image identification unit 130 as shown in FIG. 1(2) will result in an object classification device 200 being obtained. In an instance in which only the extraction of the feature description from the image is performed without the subject being classified or identified, a feature extraction device 300 can be obtained from the image-capturing means 110, feature extraction unit 120, control unit 140, and program memory 150 as shown in FIG. 1(3).

In an instance in which the feature description is extracted from an image of the subject captured by external image-capturing means in the object classification device 200 or the feature extraction device 300, the image-capturing means 110 can be omitted. In FIGS. 1(1) through 1(3), elements being affixed with identical numerals indicate that the elements have an identical function.

In the present invention, a feature description refers to information for classifying or identifying a subject from an image of the subject imaged by the image-capturing means. A feature description of the present invention is extracted by creating a maximum brightness image from the image of a subject imaged by the image-capturing means, projecting the pixels of the maximum brightness image in a three-dimensional space, and creating a frequency histogram from the pixels, as disclosed in claims 1 and 2. Specifically, {a feature description} signifies information representing the external appearance of the subject, such as: shape information such as bends, creases, folded overlaps, patterns of or on leaf blades or leaf veins, or the presence and density of stalks, stems, or fruits; information regarding the material constituting the subject itself such as the earth/sand type, or the roughness of the material or the surface finishing of a hard substance; or information regarding the type or amount of deposited matter deposited on an existing surface or adhered matter adhering to the existing surface, obtained by computer-processing an image. The feature description in the present invention may be a feature description extracted from a subject comprising a single object, or individual feature descriptions of different objects mixed in or layered on a subject comprising a plurality of objects. If a plurality of objects are present in the image, it is possible to perform a process of dividing the image into regions that appear different in the image, use each divided region as a subject, and extract a feature description from each region such as "road" or "plant bed." No particular limitations exist with regards to the subject to which the present invention can be applied; the subject may be one that does not readily change shape to one that does.

Examples of the material constituting the soft item include: cotton, silk, wool, cellulose; natural materials such as regenerated material, such as rayon, polynosic, and cupra, obtained using cellulose included in natural wooden material or the like; semi-synthetic natural materials such as acetate, triacetate, and promix synthesized from natural cellulose, an animal protein, or the like and a chemical material such as acetic acid; synthetic chemical materials obtained from petroleum or the like, such as polyamide, acrylic, nylon, aramid, vinylon, polypropylene, polyethylene, polyurethane, polyvinyl chloride, vinylidene, and polyester; organic materials such as carbon, rubber, and plant materials such as wood; inorganic materials such as silicon and glass; and metal materials such as iron, steel, and stainless steel. Products are obtained from, e.g., flakes, yarns, fibers, and wires, as well as knitted fabrics, textiles, lattices, felts obtained by intertwining fibers or the like, and unwoven cloths, in which an above material is used. Specific examples include soft items which change shape by creasing, folded overlapping, or the like, such as cloths, items of clothing, papers, and metal meshes.

Examples of objects that have different outer shapes due to individual differences despite individual objects being relatively rigid include plants, animals, food items (breads, noodles), and the like. Examples of the plants include vegetables such as cucumber, daikon, carrot, eggplant, tomato, spinach, Chinese cabbage, and cabbage, and fruits such as peach, apple, tangerine, strawberry, and grape. Examples of the animals include mammals, birds, fishes, reptiles, and insects. For example, by capturing expanded images of body surface portions of dogs and recording the captured images as, e.g., "Doberman coat," it is possible to identify dog breeds on the basis of the coat. Birds, fishes, reptiles, insects, and the like can be similarly identified.

Examples of individual objects present in a subject include asphalt as well as grass or earth on the road shoulder in a photograph of a road, and buildings in an aerial photograph.

Examples of foreign objects layered on an object in the subject include dust, paper scraps, sauce and other stains, animal hair, and food scraps on a floor. In order to identify whether a plurality of objects are layered, or not layered, in the image, it is necessary to define, in advance, the state in which the objects are layered and the state in which the objects are not layered as different states.

In the program memory 150, there are stored, in advance, e.g., a program for causing the computer shown in FIG. 1(1) to function as an object identification device, a program for causing the computer shown in FIG. 1(2) to function as an object classification device, and a program for causing the computer shown in FIG. 1(3) to function as a feature extraction device. The program is read and executed by the control unit 140, whereby actuation of an image-capturing means 110, a feature extraction unit 120, an image identification unit 130, or image classification means 230 described further below is controlled. The programs may alternatively be recorded in a recording medium and stored in the program memory 150 using installation means.

FIG. 2(1) illustrates the detailed configuration of the feature extraction unit 120, the image identification unit 130, or the image classification means 230. The feature extraction unit 120 includes at least: filter bank creation means 121 for creating a filter bank from the imaged image; filtering result synthesizing means 122 for synthesizing a filter image obtained by the filter bank creation means 121 and creating a maximum brightness image; maximum brightness image center and radius setting means 123 for setting a circular image region of the maximum brightness image obtained by the filtering result synthesis means 122 and setting the center Cc and the radius Rc of the circular image region; three-dimensional projection means 124 for projecting the maximum brightness image in a three-dimensional space; and frequency histogram creation means 125 for creating a frequency histogram from pixels projected by the three-dimensional projection means 124. No particular limitations exist with regards to the image-capturing means 110, as long as the subject can be imaged as a digital data image. In addition, there is no need to image a cloth material to a high definition; a relatively low-resolution image is acceptable. In a verification experiment, it was possible to extract a feature description enabling identification of the subject, even when the number of pixels is 640 horizontally and 480 vertically, i.e., approximately 300,000. This resolution is equal to or less than one tenth of that of a commercially available digital camera. No particular limitations exist with regards to the necessary number of pixels as long as the number is within a range in which the feature description can be extracted, even if the number of pixels is less than 300,000. Having more than 300,000 pixels will not present problems in terms of feature extraction, but an excessively large pixel number will reduce the speed of feature extraction. Therefore, the number of pixels can be set as appropriate taking into account factors such as the performance of the computer.

The image identification unit 130 includes an identification database 131 in which frequency histograms of known products are stored in association with the known products. The frequency histogram of known products stored in the identification database 131 may be one that represents a single product or a plurality of types of products. In the instance of the object classification device 200, as shown in FIG. 2(2), it is possible to provide the image classification means 230 for classifying by similarity the frequency histograms created by the frequency histogram creation means 125 instead of the image identification unit 130. In the instance of the feature extraction device 300, the feature extraction unit 120 being included will suffice; the image identification unit 130 or the image classification means 230 are not necessary.

Figure 3:
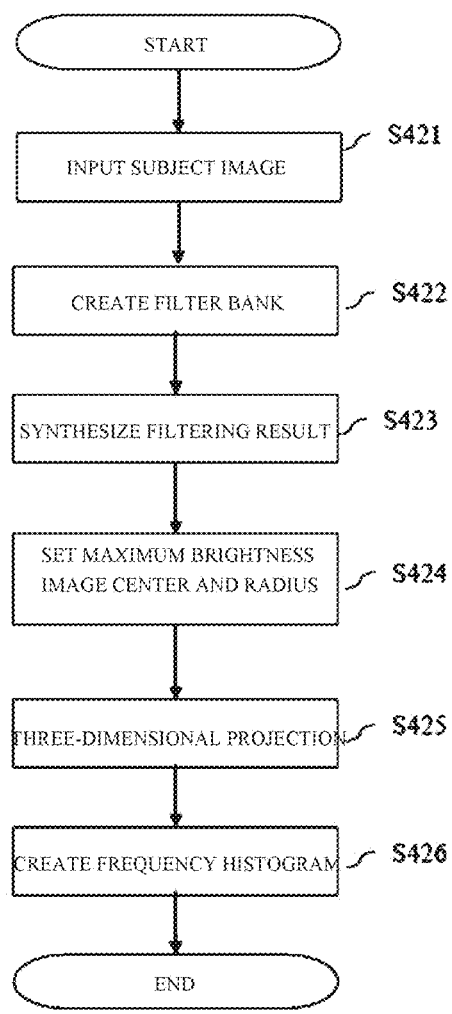
FIG. 3 shows the steps of a feature extraction method of the present invention.

FIG. 3 illustrates the actuation steps regarding the feature extraction unit 120. When a program stored in the program memory 150 is read and executed by the control unit 140, first, an image of the subject imaged by the CCD or another means is inputted (S421). Then, the feature extraction unit 120 is actuated in the sequence of: a filter bank creation step (S422) for creating a filter bank from the image; a filtering result synthesis step (S423) for synthesizing the filtering image obtained by the filter bank creation step (S422) and creating a maximum brightness image; a maximum brightness image center and radius setting step (S424) for setting a circular image region of the maximum brightness image obtained by the filtering result synthesis step (S423) and setting the center Cc and the radius Rc of the circular image region; a three-dimensional projection step (S425) for projecting the maximum brightness image in a three-dimensional space; and a frequency histogram creation step (S426) for creating a frequency histogram from the pixels projected in the three-dimensional projection step (S425).

In the filter bank creation step (S422), multiscale/multidirectional image filtering is performed on the image. In the present invention, differences such as creases and folded overlaps originating in the material are extracted as a feature description from the imaged image, instead of the shape of the subject being compared with known images. Therefore, inputted image data corresponding to only one image will be sufficient.

Performing multiscale/multidirectional image filtering and creating a filter bank are commonly used as a method for classifying texture images. In this filtering, a variety of changes are made to a wave-shaped parameter, and convolution is performed to generate a reaction image (reaction to various filters applied to the input image) with respect to each waveform. In the present invention, a Gabor filter in which the phase of the kernel function is displaced by R/2 to obtain an edge detector is used at a variety of amplitudes, window widths, direction components, and the like.

Figure 4:
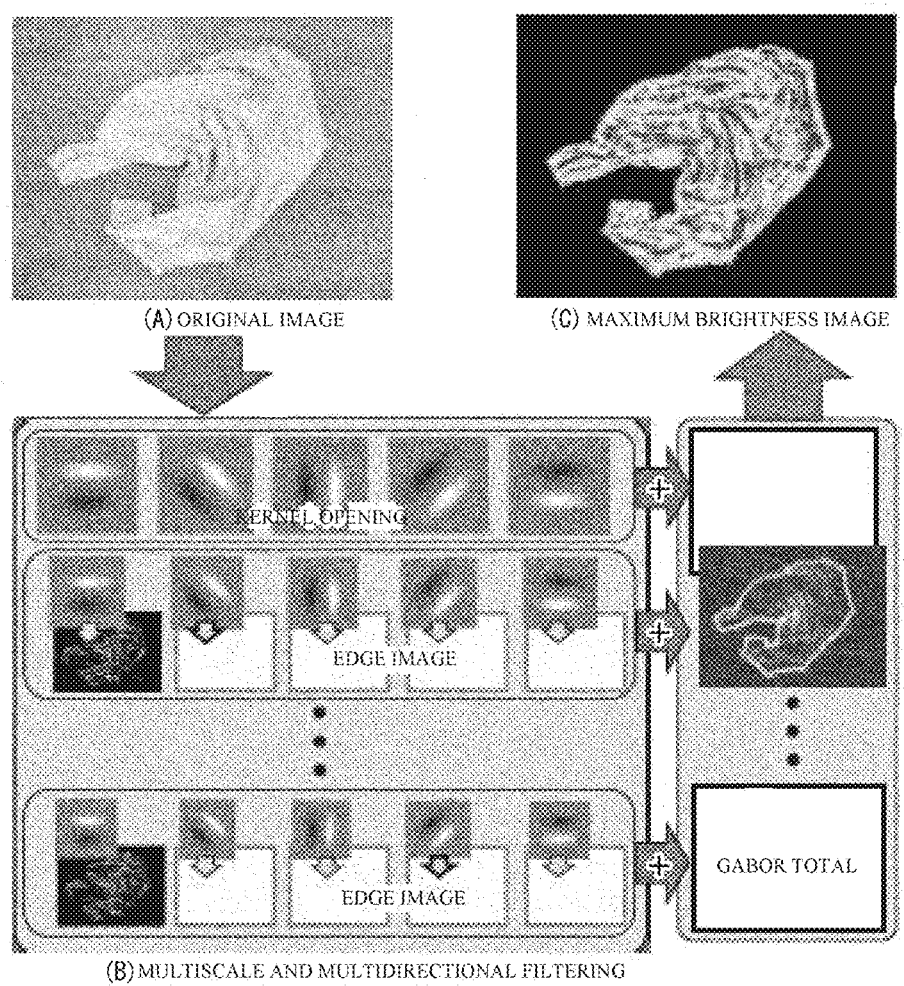
FIG. 4 shows the specific steps of filter bank creation.

FIG. 4 illustrates specific steps for creating the filter bank. FIG. 4(*a*) illustrates an imaged image in which a long-sleeved T-shirt placed casually on the floor represents the subject. The cloth product in the image can be divided into three types of portions; (1) buttons and sleeves, (2) creased portions, and (3) foldedly overlapped portions and outline of the cloth. From amongst the above, type (1) represents portions that depend on the type of the cloth product; e.g., sleeves are present on a buttoned shirt but not on a towel. In contrast, (2) creased portions and (3) foldedly overlapped portions of the cloth may be present in all cloth products. In the present invention, the state of (2) the creased portions and the state of (3) the foldedly overlapped portions of the cloth, as well as the textile shape and the material of the cloth, are extracted as feature descriptions.

FIG. 4(B) illustrates an overview of filtering. First, gentle stripe-shaped edges are detected in the image region in which the cloth product is imaged. These regions include a high density of frequencies having relatively large periods. Therefore, a Gabor filter corresponding to a variety of different amplitudes, window widths, direction components, and the like as described above is applied in order to extract this property from the image data. The individual images in FIG. 4(B) represent Gabor filters corresponding to a variety of different amplitudes, window widths, direction components, and the like. Between the individual images in the horizontal direction in FIG. 4(B), only the direction of the filter is changed. Thick creases oriented in a specific direction on the cloth are emphasized according to the direction of the filter. Between the individual images in the vertical direction in FIG. 4(B), the frequency of the filter is gradually made smaller in an incremental manner. As the frequency decreases, thinner creases can be emphasized, and the shape of the textile of the cloth becomes easier to observe. The frequency of the filter used in the present invention is preferably varied between 1.0 to 8.0 pixels; in particular, pixel values of 1.0 to 3.0 are effective for observing thinner creases and viewing the difference in textiles. The filter is also used to extract foldedly overlapping portions of the cloth. With regards to the black and white in the image, white portions correspond to portions that exhibited a strong reaction in filtering with regards to gentle creases, and black portions correspond to portions for which it has been determined that thinner creases and foldedly overlapped portions ought to be emphasized in relation to gentle creases (i.e., portions for which it has been determined that the portions ought to be used for identification).

The Gabor filter will now be described in further detail. This Gabor filter is used for scale space construction and the like in wavelet transform, and is represented by the following relationship:

{Numerical relationship 1}

$$g(x, \theta, \sigma_x, \sigma_y) = \frac{1}{\sqrt{2\pi}\,\sigma_x\sigma_y} e^a \cos(2\pi f x_\theta + p) \quad (1)$$

where the following relationship is true:

{Numerical relationship 2}

$$a = -\frac{1}{2}\left(\frac{x_\theta^2}{\sigma_x^2} + \frac{y_\theta^2}{\sigma_y^2}\right) \quad (2)$$
$$x_\theta = (x - u_x)\cos\theta + (y - u_y)\sin\theta$$
$$y_\theta = -(x - u_x)\sin\theta + (y - u_y)\cos\theta$$

Figure 5:
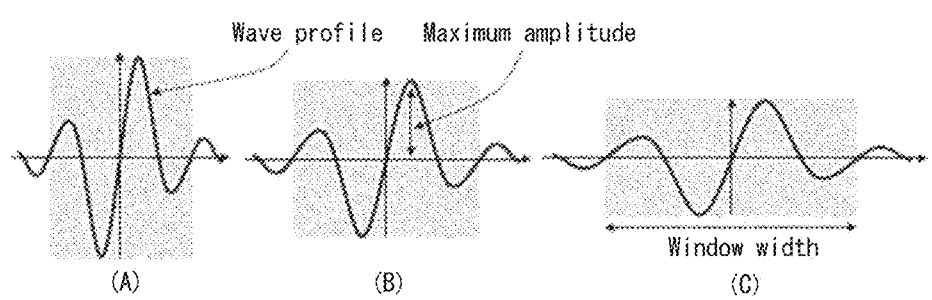
FIG. 5 shows the configuration of edge detection filters having varying directions and sizes, the shape of the filter being defined by the amplitude and window width.

Here, f represents the frequency region. $\sigma_x^2$ and $\sigma_y^2$ are values determining the kernel size. As shown in FIG. 5, f is determined in connection with σ. For example, the value of σ is determined so that the volume of a shape defined by the horizontal axis of the graph and the curve representing relationship (1) is uniform, irrespective of the amplitude value. In the present invention, in order to handle x and y in a similar manner, $\sigma_x$ and $\sigma_y$ will be denoted as σ hereafter. In other words, f(x, θ, $\sigma_x$, $\sigma_y$) will be referred to as f(x, θ, σ). (x, y) represents the coordinates of the current pixel, and $u_x$, $u_y$ is the center coordinates for a Gaussian distribution. p is a variable representing the phase; setting π/2 as p constitutes the edge detector in the present invention.

Since a Gabor filter is directional, it is possible to set θ in relationship (1) to emphasize an edge in a specific direction. In order to examine the direction of a crease or the like, filtering is performed while varying θ. Specifically, edge detection is performed for each of eight separate directions between −π≤θ<π. With regards to pixels that exhibited a negative value during filtering in each direction, the value is corrected to zero.

Next, in the filtering result synthesis step S(423), the image obtained by filtering is synthesized, and the maximum brightness image (may be referred to as "MM image") is generated. For the MM image, pixel values (brightness values) of pixels that are in the same positions in all images (images along the horizontal direction in FIG. 4(B)) are added and a single image is generated ("Gabor total" in FIG. 4(B)). Similar processes are performed with a variety of changes being made to σ, whereby a plurality of images are obtained. The MM image is an image in which the value of σ at which the maximum brightness value was exhibited in the images described above is used as the pixel value (brightness value) of each of the pixels.

FIG. 4(c) is the synthesized MM image. Portions having a higher concentration of darker pixels represent creases, folded overlaps, pile, and other uneven portions, and signify that a strong reaction was obtained using a filter in which σ has been set to a low value. Bright portions in FIG. 4(c) signify portions of thin creases and portions where the cloth is smooth. When this image is represented as $I_{mag}(x)$, the calculation formula is expressed as follows.

{Numerical relationship 3}

$$I_{mag}(x) = \mathrm{argmax}\,F_2(x, \sigma) \quad (3)$$

Here,
{Numerical relationship 3}

$$F_2(x,\sigma) = \int_\theta \int_w f(x) g(x+x_0, \theta, \sigma) dx_0 d\theta. \quad (4)$$

The window width w and the frequency f are automatically determined from σ. According to the setup in the present invention, the width of the window was defined as w=6×σ, and the frequency was defined as f=1/(3×σ). Meanwhile, the value for the maximum amplitude of the waveform was obtained using the following relationship.

{Numerical relationship 5}

$$\lambda_{max} = \frac{cons}{x}. \quad (5)$$

With the aforementioned settings, the constant "cons" was set to 0.3171. This value was obtained from the result of adjusting the area of the portion between the horizontal axis and the waveform in FIG. 5 so as to be constant for all values of σ.

Figure 6:
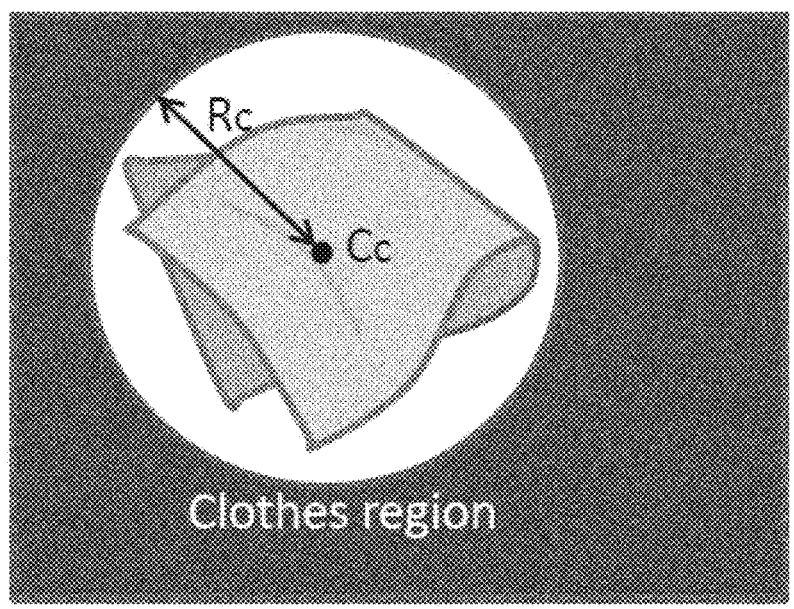
FIG. 6 shows the center Cc and radius Rc of a circular clothing region set from the maximum brightness image.

Once the maximum brightness image is synthesized, in the maximum brightness image center and radius setting step (S424), as shown in FIG. 6, the clothing region is extracted from the maximum brightness image, a circular region surrounding the region is defined, and the center Cc and the radius Rc of the region are set.

Once the center Cc and the radius Rc of the maximum brightness image region are set, the maximum brightness image is projected in a three-dimensional space in the three-dimensional projection step (S425). The axes for the three-dimensional projection are set as follows according to the feature description to be extracted in the maximum brightness image.

First, a description will be given for the cloth material and wrinkle distribution method (CM-WD method), which is a method for extracting a feature description focusing on the cloth material and the density of the wrinkles, in the embodiment of the present invention.

Figure 7:
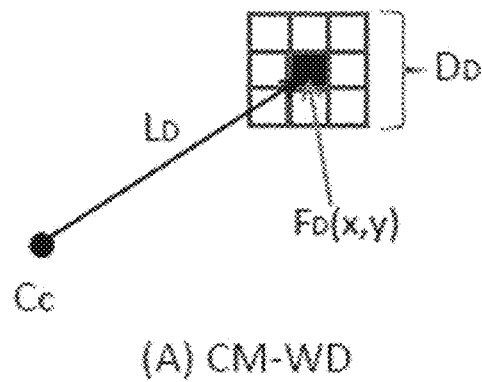
FIG. 7 shows an overview of the CM-WD method (feature extraction method focusing on the density of creases and the cloth material) of the present invention, and shows a designated pixel and surrounding pixels, with the center Cc of the maximum brightness image region being the origin.

A variety of materials such as cotton and polyester are used to form cloth products, and methods for producing such materials are also diverse. In addition to such conditions, the manner in which wrinkles form is also affected by factors such as the thickness of the cloth. Designing a feature description that adequately describes the state of the cloth product arising from such differences may make it possible to classify cloth products. Therefore, as shown in FIG. 7, the following three parameters are examined, using the center Cc of the MM image region as the origin, with regards to all pixels in the MM image.

1. Ratio between the distance $L_D$ between the pixel position (x, y) and the center Cc, and the radius Rc
2. Brightness value $F_D$(x, y) of the pixel
3. Total of the difference between the brightness value $F_D$ of the pixel and the brightness value of a nearby pixel The total of the difference in the brightness values with respect to nearby pixels in item 3 can be represented by the following relationship.

{Numerical relationship 6}

$$D_D = \Sigma_{i,j \in w}(F_D(x,y) - F_D(x+i, y+j)) \quad (6)$$

$$Dv = Li{\sim}j \in w(Fv(x,y) - FD(X+i, y+j)) \quad (6)$$

Figure 8:
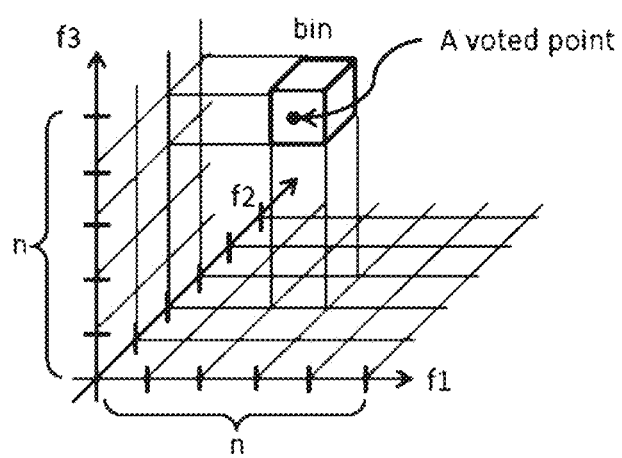
FIG. 8 shows an overview of pixel number count in each three-dimensional grid obtained by projecting feature descriptions in a three-dimensional space and partitioning the three-dimensional space into $n^3$ three-dimensional grids.

All of the pixels in the MM image are, as shown in FIG. 8, projected in a three-dimensional space in which the axes represent the aforementioned three parameters, whereby all of the pixels in the MM image are distributed in the three-dimensional space.

Figure 9:
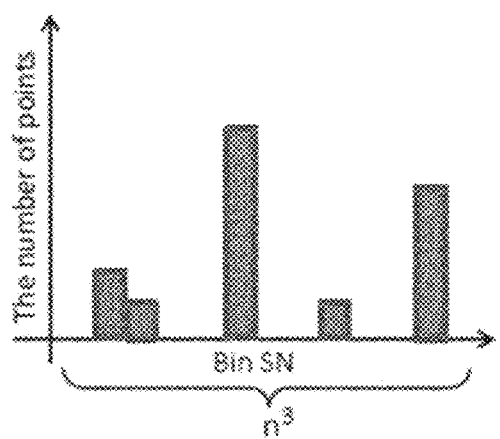
FIG. 9 shows a frequency histogram, the horizontal axis representing grids partitioned into $n^3$ grids, and the vertical axis representing the number of pixels present in each grid.

Next, in the frequency histogram creation step (S426), each of the axes is divided equally into n parts, whereby the three-dimensional space is partitioned into $n^3$ three-dimensional grids, and the number of pixels present in each of the grids is extracted. As shown in FIG. 9, a one-dimensional histogram is obtained with the horizontal axis representing each of the grids and the vertical axis representing the number of pixels present in each grid. Feature extraction carried out as described above does not vary according to factors such as the shape, size, and orientation of the cloth; therefore, substantially similar frequency histograms are obtained for products of the same type. No particular limitations exist for the number ($n^3$) of the three-dimensional grids, although n is preferably 4 to 16. If n is less than 4, a single grid will contain an excessively high number of pixels, preventing the feature description from being extracted in an appropriate manner. In contrast, if n is 17 or greater, a single grid will contain too low a number of pixels, preventing the feature description from being extracted in an appropriate manner. Accordingly, it is preferable that n is 8.

Next, a description will be given for the existence of cloth-overlaps (OVLP) method, which is a feature extraction method focusing on the position and direction of folded overlaps of the cloth and which is another embodiment of the present invention. In the OVLP method, the axes projected in the three-dimensional projection step (S425) are set as follows.

The OVLP method is a method that focuses on the filtering results at relatively short wavelengths, making it possible to extract cloth boundaries and folded overlaps of the cloth. FIG. 10 shows an overview of a description of the OVLP method, based on the output of the MM image. First, regions of interest such as cloth boundaries and folded overlaps of the cloth are set in the MM image, and the following three types of parameters are examined with regards to the pixels in the regions of interest (hereafter referred to as "pixels of interest").

1. Ratio between the distance $L_D$ between the position (x, y) of the pixel of interest and the center Cc, and the radius Rc
2. Value $E_O$ in which whether the pixel of interest is positioned on the upper side or the lower side of a folded overlap is evaluated by a continuous value
3. Direction component of the folded overlap portion in which the pixel of interest is present Of the above parameters, the "value $E_O$ in which whether the pixel of interest is positioned on the upper side or the lower side of a folded overlap is evaluated by a continuous value" is calculated using the following method. First, an image edge deemed to be a folded overlap (i.e., an edge-part image, corresponding to the snaking thick black line portion in FIG. 10) is determined from the result in FIG. 4 (Gabor total), and a straight-line approximation is performed, taking the edge to be locally linear (dotted line portion in FIG. 10). In this straight-line approximation, first, there are readied (1) an image I1 in which portions thought to be folded overlaps are white and the remaining portions are black, and (2) an image I2 obtained by grayscaling the original image. Then, the following process is performed, sequentially referencing the white pixels in the image I1. A localized region (in the actual setup, about 16×16 pixels) centered on a given white pixel (referred to here as pixel A) is referenced, and one straight line that covers as many white pixels as possible within the localized region is selected. Then, a, b, and c in the equation ax+by+c=0 representing the straight line are obtained as parameters.

Next, the brightness values of a plurality of pixels on both sides of the edge are examined, and whether the pixels are on the upper side or the lower side of the folded overlap is determined. With regards to the specific determining procedure, first, with regards to a black pixel in the vicinity of pixel A (referred to here as pixel B), which side of the straight line pixel B is present in can be determined by substituting the coordinate values of B into x and y in ax+by+c=0. An examination is made in regard to the brightness values of the pixels in the aforementioned (2) grayscaled image I2 as to which side of the two regions divided by the straight line contains a greater number of bright brightness values. The side containing a greater number of pixels having a bright brightness value as a result is deemed to be the upper side, and the opposite side is deemed to be the lower side, and a map in which a value of 1 is imparted to pixels in the former side and a value of −1 is imparted to pixels in the latter side is temporarily created. Next, with regards to a given pixel and nearby pixels, there is defined a variable for which the values of 1 or −1 imparted thereto are added. The variable is then divided by the number of nearby pixels to obtain a real value. This real value is the "value $E_O$ in which whether the pixel of interest is positioned on the upper side or the lower side of a folded overlap is evaluated by a continuous value." This process is performed with regard to all pixels in the vicinity of the edge.

These results regarding the pixels of interest in the MM image are projected, as with the CM-WD method, in a three-dimensional space in which the axes represent the aforementioned three parameters, and a frequency histogram is obtained. The resulting expression does not vary with respect to scale, rotation, and translation.

(Feature Descriptions for Comparison)

Other than the aforementioned feature extraction methods of the present invention (CM-WD method and OVLP method), the following three types of feature descriptions were also extracted and tested as described below for comparison. The first is a feature description focusing on creasing in the cloth. The second uses a part of a feature description calculation commonly used for conventional identification. The third uses an intermediate processing result obtained in the process of performing calculations according to the CM-WD method and OVLP method. A description will now be given with regards to each of the feature descriptions.

(Feature Description Regarding Distribution and Direction of Creases: Distribution of Wrinkle Position (DST-W))

Multidirectional filtering using a filter bank makes it possible to establish the presence and gradient direction of smooth brightness changes such as creases. Regions that are extracted as creases are divided according to the difference in the direction component, and each result of the division is approximated to an ellipse. The number of divisions is equal to the number of direction components when the filter bank is generated. A similar approach is adopted in regard to the division spacing. The result is projected in a three-dimensional space in which the axes are the following three parameters.

1. Ratio between the length of the long axis of the ellipse, and the radius Rc
2. Ratio between the length of a line segment $L_E$ linking the center Cc and the center coordinates $C_E$ of the ellipse region, and the radius Rc
3. Relative angle $\theta_E$ between the line segment $L_E$ and the long axis of the ellipse The center Cc and the radius Rc are as shown in FIG. 6. FIG. 11 illustrates the relationship between the parameters regarding the three-dimensional projection according to the DST-W method, where $C_E$ is the center coordinates of the ellipse region, and $\theta_E$ is the relative angle between the line segment $L_E$ and the long axis of the ellipse. This process is performed on all crease regions; then, as with the CM-WD method, the feature space is partitioned into three-dimensional grids and the number of values present in each of the grids is extracted, whereby a frequency histogram is obtained.

(Scale Space Extrema (SSEX))

In a common image feature "SIFT," extrema in a scale space are used, and feature description that is robust with respect to scale, translation, and rotation changes is realized. Focusing on the extrema is also thought to be useful in the present invention for describing the cloth material and the manner in which creases are formed. The following feature descriptions are used from the detected extrema and the surroundings thereof.

1. Scale value of the extremus
2. Ratio between the radius Rc and the distance between the center Cc and the respective extremus
3. Ratio between the radius Rc and the distance between the present extremus and the nearest extremus The center Cc and the radius Rc are as shown in FIG. 6. As with the aforementioned CM-WD method, projection to a three-dimensional space is performed, the feature space is partitioned into three-dimensional grids, and the number of values present in each grid is extracted, whereby a frequency histogram is obtained.

(Outline of Cloth Region: Contour (CNTR))

It is necessary to extract the region of the cloth product as pre-processing for the aforementioned extraction of the feature description (CM-WD method and OVLP method) according to the embodiment of the present invention. Specifically, the outline of the cloth product is obtained in the course of the feature description calculation. Accordingly, a feature description is also calculated according to the following step from the outline. First, the image is binarized to the cloth region and other regions. The image is then subjected to a polar coordinate conversion, and a θ-r graph centered on the center Cc is generated. Here, θ represents the tilt angle of the straight line passing through the center Cc when the horizontal axis of the image represents zero degrees, and r is the distance on the line segment from the center Cc to the outline. It is thereby possible to obtain a distance histogram relating to the boundary line. The histogram is then discretized at arbitrary spacings, and a feature vector is generated.

Next, an example of a step for creating the identification database 131 included in the image identification unit 130 will now be described with reference to FIG. 12. First, a plurality of known products are readied as subjects, and a plurality of images captured from a variety of angles are readied for each of the known products. Then, the first image of the first known product is inputted (S531), a frequency histogram is created (S532) according to the aforementioned steps (S422)-(S426), it is determined whether or not there are any unprocessed images among the plurality of images of a single known product prepared in advance (S533), and if there are any unprocessed images, the steps (S531)-(S532) are repeated. If there are no unprocessed images, creation of the frequency histogram of the first known product is completed, and it is determined whether or not there is an image of the next known product (S534). If there is an image of the next known product, the steps (S531)-(S533) are repeated. Once processing of the readied images of the known product is complete ("No" in S534), the flow proceeds to a step in which the created frequency histogram is associated with the known product and stored in the database (S535). In this step, the frequency histograms are grouped for each known product for which the frequency histogram has been created, a boundary surface is set at the boundary with respect to a frequency histogram group for another known product, and each group is associated with a known product and stored in the database, whereby the identification database 131 is created. The boundary surface can be set using a known machine learning method such as support vector machine (SVM). The number of images prepared in advance for each known product varies according to the desired identification accuracy, and no particular lower limit therefore exists. However, since the identification error decreases with more images, the number of images to be prepared is preferably 200 or more.

Other than the aforementioned method, the identification database 131 may also be created, e.g., by associating individual frequency histograms created from a plurality of images of a known product and storing the frequency histograms in a database. No particular limitations exist, as long as the method is a well-known one used to solve classification problems in machine learning and similar fields.

Then, in the steps shown in FIG. 3, a frequency histogram is created from the image of the subject to be identified, and it is determined which of the frequency histogram groups stored in the identification database 131 the frequency histogram belongs to, whereby it is possible to identify the subject. If the object identification device of the present invention is applied, e.g., to a transportation line of a cleaning plant, the cleaned item, such as a buttoned shirt, a handkerchief, or a towel which has been transported is imaged as a subject, a frequency histogram is created from the imaged image, the subject is then identified using the identification database 131, and {the subject} is then automatically transported to the processing step corresponding to the identification result, whereby sorting of cleaned items and transportation of the cleaned items to the processing step in a cleaning plant can be automated.

If the subjects are classified into similar groups without identifying the subjects, there is no need to provide an identification database 131; instead, it is possible to provide image classification means 230 for classifying similar frequency histograms into the same groups and constitute an object classification device. For the image classification means 230, known image classification means such as repeated bisection (non-patent document 7) or K-means can be used. If the object identification device of the present invention is applied, e.g., to a transportation line of a cleaning plant, it is possible to image a buttoned shirt, a handkerchief, a towel, or the like as a subject, create a frequency histogram from the imaged image, classify similar frequency histograms into the same groups, and thereby automatically sort cleaned items.

{Embodiments}
(Products Used in Embodiment)

9 classes of everyday-use cloth products (1) to (9) shown in the upper section of FIG. 13 were used in the embodiment. The left side of the lower section shows the cloth product (7) and the right side of the lower section shows the cloth product (9) in a state of being foldedly overlapped as seen in real life. The type and material of the cloth product are as follows: (1) turtleneck sweater (100% cotton); (2) thick parka (100% polyester); (3) sweater (100% cotton); (4) cardigan (100% acrylic); (5) dress (100% cotton); (6) T-shirt (100% cotton); (7) hand towel (100% cotton); (8) hand towel (100% cotton); and (9) shirt (78% cotton, 22% polyester). Both (7) and (8) are pile material towels, but having different sizes and shapes when spread.

(Classification of Subject)

Unsupervised clustering was performed to evaluate whether or not the frequency histogram obtained by the feature extraction method of the present invention is suitable for classification of subjects. Repeated bisection was used as the clustering method. This method is one for automatically grouping similar frequency histograms without an external standard in which the provided data is stored in a database or the like. If the frequency histograms extracted using the aforementioned extraction method are similar, the frequency histograms are classified by the type of the cloth product, irrespective of the manner in which the cloth product is placed.

In the present embodiment, the number n of divisions in relation to each axis of a three-dimensional space when a frequency histogram is created was set to eight. Unsupervised clustering was performed on approximately 250 frequency histograms on each of cloth products (6) to (9), i.e., a total of approximately 1000 frequency histograms. The number of clusters (number of groups to which classification is performed) was set to 10. Table 1 shows results regarding the CM-WD method, which is the embodiment of the present invention, and table 2 shows results regarding the SSEX method, which is a comparative example.

TABLE 1

| | Cluster | | | | | | | | | |
|---|---|---|---|---|---|---|---|---|---|---|
| | 1 | 2 | 3 | 4 | 5 | 6 | 7 | 8 | 9 | 10 |
| (6) Tshirt | 0 | 64 | 5 | 0 | 0 | 0 | 0 | 47 | 112 | 1 |
| (7) Towel | 58 | 0 | 2 | 3 | 82 | 85 | 12 | 47 | 1 | 9 |
| (8) Towel | 2 | 0 | 0 | 0 | 28 | 24 | 95 | 1 | 11 | 72 |
| (9) Shirt | 0 | 1 | 119 | 124 | 0 | 0 | 0 | 2 | 0 | 0 |

TABLE 2

| | Cluster | | | | | | | | | |
|---|---|---|---|---|---|---|---|---|---|---|
| | 1 | 2 | 3 | 4 | 5 | 6 | 7 | 8 | 9 | 10 |
| (6) Tshirt | 40 | 68 | 1 | 71 | 5 | 28 | 1 | 30 | 0 | 2 |
| (7) Towel | 3 | 10 | 34 | 2 | 23 | 11 | 102 | 28 | 53 | 33 |
| (8) Towel | 10 | 3 | 12 | 2 | 23 | 6 | 14 | 52 | 14 | 64 |
| (9) Shirt | 3 | 30 | 41 | 15 | 10 | 92 | 16 | 5 | 16 | 1 |

As can be seen in table 2, according to the conventional SSEX method, even though grouping into cloth products is performed to a certain extent, a variety of cloth products are classified into groups (clusters) in which the feature description is similar (e.g., 68 T-shirts (6), 30 shirts (9), 10 towels (7), and 3 towels (8) are classified in cluster 2) and no correspondence relationship can be identified between feature descriptions and cloth products.

In contrast, with regards to the CM-WD method, which is the feature extraction method of the present invention in table 1, it can be confirmed that identical products will be classified into the same cluster irrespective of the shape of the cloth product, in contrast to the conventional SSEX method (e.g., cluster 2 containing 64 T-shirts (6), only one shirt (9), and zero towels (7) or towels (8)), and a correspondence relationship can be identified between the feature descriptions and the cloth products. Therefore, using the feature extraction method according to the present invention makes it possible to classify similar subjects into identical groups irrespective of the shape such as that arising from creases and folded overlaps and without using identification means for identifying the subject.

(Identification of Subject)

Identification is performed using machine learning methodology to determine whether or not a frequency histogram obtained using the feature extraction method according to the present invention is suitable for identification of subjects. First, in order to identify the cloth product to which the frequency histogram extracted from the image of the subject corresponds, a cloth product was casually placed on a flat surface such as a floor or a table for each of the cloth products (1) to (9) shown in FIG. 13, and approximately 250 images were captured for each of the cloth products. An image size corresponding to VGA (640×480 pixels) was used, and approximately 2400 items of image data were obtained. With regards to each of the images, in the steps shown in FIG. 12, a frequency histogram according to the CM-WD method and the OVLP method representing the present invention and a frequency histogram according to the DST-W method and the SSEX method were created, the frequency histograms were grouped according to product, the boundary surface between each of the groups is set and the frequency histograms were stored in a database in association with known products, whereby an identification database 131 was created. Multiclass Support Vector Machine (SVM) was used in the creation of the identification database 131. For the setup, LIBSVM (non-patent document 8) was used, and C-SVC and RBF kernel were set for the identifying means and the kernel function, respectively. With regards to the CNTR method, as described above, distance histograms relating to the boundary line were discretized at arbitrary spacings, and the generated feature vector was associated with a known product and stored in the database.

N-fold cross-validation was applied as the method for evaluating the performance of the identification database 131. FIG. 14 shows the variations in identification rates as N is varied from 2 to 10 for the CM-WD and OVLP methods of the present invention and the DST-W, SSEX, and CNTR methods of the comparative examples. Again, the CM-WD method, which is a feature extraction method of the present invention, exhibited the best result with an identification rate of 89%, while the identification rate of the SSEX method, which is a comparative example, was merely 61%.

Next, with regards to the CM-WD, OVLP, SSEX, and DST-W methods, two or three types of the corresponding histograms were linked, and an identification database 131 was created as learning data. Linking histograms refer to arranging one type of histogram in succession after another type of histogram. For example, in FIG. 15, "CM-WD OVLP" refers to the histogram for the OVLP method being arranged in succession after the histogram for the CM-WD method. As can be seen from FIG. 15, when CM-WD and SSEX are arranged next to each other, the identification rate reaches 98% at its highest, revealing that the type of the cloth product can be correctly identified in almost all instances irrespective of the shape of the cloth product.

In the graph, the identification rate becomes stable where the value of N is 4 to 5. It is thereby revealed that about 200 is sufficient for the number of items of learning data, even though cloth products can take on an infinite number of shapes.

Industrial Applicability

Through installation on a robot or another machine, it is possible to extend the range of items that can be handled by the present invention from soft items to rigid bodies, and the present invention is useful in the fields of IT, automotive vehicles, production machinery, and medicine/healthcare. In particular, in the present invention, the feature description can be extracted irrespective of the outer shape of the subject without using a special physical means, and the type of the subject can be identified according to the feature description. Therefore, the present invention is useful for: automation of handling of soft items such as automatic sorting of objects being cleaned in a cleaning plant; automation of identifying the state of use of a product such as a shirt, through extracting, as a feature description, the temporal change due to use of the product; automation of identifying clothing worn by pedestrians through cameras installed on the street; development of automatic travel systems for electric wheelchairs and automobiles; development of automatic vacuum cleaners that focus cleaning on soiled portions where dust, refuse, or stains are present; identification of similarities between cities through extraction of feature descriptions from aerial photographs; automation of classification of vegetables, fruits, or the like; automation of identifying freshness of vegetables, fruits, and the like through extracting changes in the feature description due to temporal change in vegetables, fruits, or the like; and improvement to the learning function in libraries, museums, and resource centers and the like through sending images of subjects such as birds and plants online and identifying the subject type.

The invention claimed is:

1. A feature extraction method for extracting a feature description from an image of a subject, the feature extraction method comprising the steps of:
   capturing the image with an image capturing device;
   electrically creating a filter bank from said image;
   electrically creating a maximum brightness image from said filter bank;
   electrically setting a circular image region of said maximum brightness image, and setting a center Cc and a radius Rc of the circular image region;
   electrically projecting a pixel in the maximum brightness image in a three-dimensional space having axes representing (a) a ratio between a distance $L_D$ between a pixel position (x, y) of the pixel and said center Cc, and said radius Rc, (b) a brightness value $F_D(x, y)$ of the pixel, and (c) the total of the difference between the brightness value $F_D$ of the pixel and the brightness value of a nearby pixel; and
   electrically creating a frequency histogram from the pixels projected in said three-dimensional space.

2. The feature extraction method according to claim 1, said subject being a soft item.

3. The feature extraction method according to claim 1, said filter bank being created using a Gabor filter.

4. An object classification method comprising:
   electrically classifying the subject using the frequency histogram extracted using the feature extraction method according to claim 1.

5. An object identification method comprising;
   electrically comparing the frequency histogram extracted using the feature extraction method according to claim 1 to a frequency histogram of a known subject; and identifying a type of the subject.

6. The object identification method according to claim 5, wherein the comparing the extracted frequency histogram with a frequency histogram of a plurality of the known subject types, whereby the type of the subject is identified.

7. A computer program stored in a non-transitory computer readable medium, the computer program configuring a feature extraction device to execute the feature extraction method according to claim 1.

8. A non-transitory computer-readable medium that, when executed with a feature extraction device, causes the feature extraction device to execute the feature extraction method according to claim 1.

9. A feature extraction method for extracting a feature description from an image of a subject, the feature extraction method comprising:
   capturing the image with an image capturing device;
   electrically creating a filter bank from said image;
   electrically creating a maximum brightness image from said filter bank;
   electrically setting a circular image region of said maximum brightness image, and setting a center Cc and a radius Rc of the circular image region;
   electrically projecting a pixel in the maximum brightness image in a three-dimensional space having axes representing (d) a ratio between the distance $L_o$ between the position (x, y) of the pixel and said center Cc, and said radius Rc, (e) a value $E_o$ in which whether the pixel is positioned on an upper side or a lower side of a folded overlap is evaluated by a continuous value, and (f) a direction component of the folded overlap portion in which the pixel is present; and
   electrically creating a frequency histogram from the pixel projected in said three-dimensional space.

10. A feature extraction device for extracting a feature description from an image of a subject captured by image-capturing means, the feature extraction device comprising:
    filter bank creation means for creating a filter bank from said image;
    filtering result synthesizing means for creating a maximum brightness image from said filter bank;
    maximum brightness image center and radius setting means for setting a circular image region of said maximum brightness image, and setting a center Cc and a radius Rc of the circular image region;
    three-dimensional projection means for projecting a pixel in the maximum brightness image in a three-dimensional space having axes representing (a) a ratio between the distance $L_D$ between the pixel position (x, y) of the pixel and said center Cc, and said radius Rc, (b) the brightness value $F_D(x, y)$ of the pixel, and (c) the total of the difference between the brightness value $F_D$ of the pixel and the brightness value of a nearby pixel; and
    frequency histogram creation means for creating a frequency histogram from the pixels projected in said three-dimensional space.

11. The feature extraction device according to claim 10, wherein said subject being a soft item.

12. The feature extraction device according to claim 10, wherein said filter bank being created using a Gabor filter.

13. An object classification device comprising image classification means for classifying a subject using the frequency histogram extracted using the feature extraction device according to claim 10.

14. An object identification device comprising:
- an identification database storing a frequency histogram of a known subject, and
- identification means for comparing, with the frequency histogram of the known subject stored in said identification database, and identifying, the frequency histogram extracted by the feature extraction device according to claim 10.

15. The object identification device according to claim 14, wherein:
- the frequency histograms of the known subject stored in said identification database are frequency histograms of a plurality of types of subjects, and
- said identification means compares said extracted frequency histogram with the plurality of types of frequency histograms stored in said identification database, and thereby identifies the type of the subject.

* * * * *